United States Patent [19]

Dorman

[11] Patent Number: 5,703,424
[45] Date of Patent: Dec. 30, 1997

[54] BIAS CURRENT CONTROL CIRCUIT

[75] Inventor: Richard A. Dorman, Wynantskill, N.Y.

[73] Assignee: Mechanical Technology Inc., Latham, N.Y.

[21] Appl. No.: 714,246

[22] Filed: Sep. 16, 1996

[51] Int. Cl.$^6$ ............................................ H02K 7/09
[52] U.S. Cl. .................................................. 310/90.5
[58] Field of Search ................... 310/90.5; 318/611, 318/632

[56] References Cited

U.S. PATENT DOCUMENTS

| | | | |
|---|---|---|---|
| 4,090,745 | 5/1978 | Dohogne et al. | 310/90.5 |
| 4,392,693 | 7/1983 | Habermann et al. | 310/90.5 |
| 5,202,824 | 4/1993 | Chen | 310/90.5 |
| 5,306,975 | 4/1994 | Bichler | 310/90.5 |
| 5,467,244 | 11/1995 | Jayawant et al. | 361/144 |
| 5,562,528 | 10/1996 | Ueyama et al. | 310/90.5 |
| 5,576,587 | 11/1996 | Takahashi et al. | 310/90.5 |

*Primary Examiner*—Clayton E. Laballe
*Attorney, Agent, or Firm*—Kane, Dalsimer, Sullivan, Kurucz, Levy, Eisele and Richard, LLP

[57] ABSTRACT

A control system for a magnetic bearing includes a sensor which generates an output representative of the relative shaft position. The signal from the sensor is processed by an integrator and offset adjustment block and a difference amplifier to subtract the processed sensor signal from a reference voltage. The difference signal result is fed to a bias control circuit including voltage dividers which generates a voltage which is received by coil current power amplifiers for both the upper and lower magnetic coils. Coil currents are then generated to stabilize the magnetic bearing.

9 Claims, 3 Drawing Sheets

BIAS CURRENT CONTROL CIRCUIT

BACKGROUND OF THE INVENTION

1. Field of the Invention

The present invention pertains to an apparatus and method for controlling the stability of a magnetic bearing system which has a large variation in the stator-to-rotor magnetic air gaps.

2. Description of the Prior Art

Stability is of paramount concern in a magnetic bearing system. However, this is increasingly difficult when the magnetic bearing system is introduced into an environment with operating conditions resulting in large stator-to-rotor magnetic air gaps. Additionally, variations in temperature and shaft speed can further complicate the control.

The stabilization of a radial active magnetic bearing requires a negative feedback servo-control system to locate a shaft at the center of a bearing stator assembly. In general, a bearing is configured with two orthogonal and independent control axes to produce the centering force required to counteract the static and dynamic load forces. The hardware for each bearing axis consists of a differential sensor to produce an indication of the relative shaft-to-stator location, a control circuit to derive the current levels that will maintain the shaft centered within the stator from the shaft location information, current drive amplifiers to supply the control currents to the magnetic coils, and coils on either side of the shaft which provide the shaft centering forces. The magnetic fields produced by the coils generate attractive forces which balance the shaft weight and the shaft rotating imbalance force.

The balancing of the shaft weight and shaft imbalance force with the stator coil magnetic forces will center the shaft in the stator within a small fraction of the bearing clearance gap as long as the relative bearing stator and shaft lamination dimensions are constant. However, differential dimension changes between the shaft and stator magnetic laminations caused by differences in the operating temperatures of the two assemblies and shaft centrifugal growth, can result in a variation in the forces produced by the magnetic coils when the coils are driven with a constant average current value. This magnetic force variation can not be completely compensated by the shifting of currents between the two control axis coils, and the uncompensated force component can cause the shaft to move from the stator center line.

The effects of varying shaft-to-stator air gap dimensions on active magnetic bearing servo-control systems have been observed in prior art bearing installations, and several compensation approaches have been developed to compensate for the effects of the gap variations. U.S. Pat. No. 4,308,490 to Habermann describes two different techniques which prevent bearing air gap variations from producing undesired changes in the bearing servo-control operation. The first of the two techniques proposed in this reference requires the use of additional magnetic coil, or electronic flux sensors within the bearing stator assembly. The second technique is a method by which the bearing axis shaft-to-stator relative location signal of the servo-controlled system is used to perform the compensation of air gap dimensions. To use the location signal, a rather complicated electronic circuit must be added to the servo-control system.

The use of additional coils, sensors and/or magnetic flux control elements along with the use of a complicated electronic circuit has increased the complexity and cost of the prior art, while reducing the reliability thereof.

OBJECTS AND SUMMARY OF THE INVENTION

It is therefore an object of this invention to control the stability of a magnetic bearing system which has a large variation in the stator-to-rotor magnetic air gaps.

It is therefore a further object of this invention to produce air gap compensation in a magnetic bearing system without the use of additional coils, sensors and/or magnetic flux control elements.

It is therefore a further object of this invention to produce the required air gap compensation in a magnetic bearing system by using the shaft-to-stator location signal in conjunction with a simple integrator and amplifier circuit which is added to the existing servo-control system.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
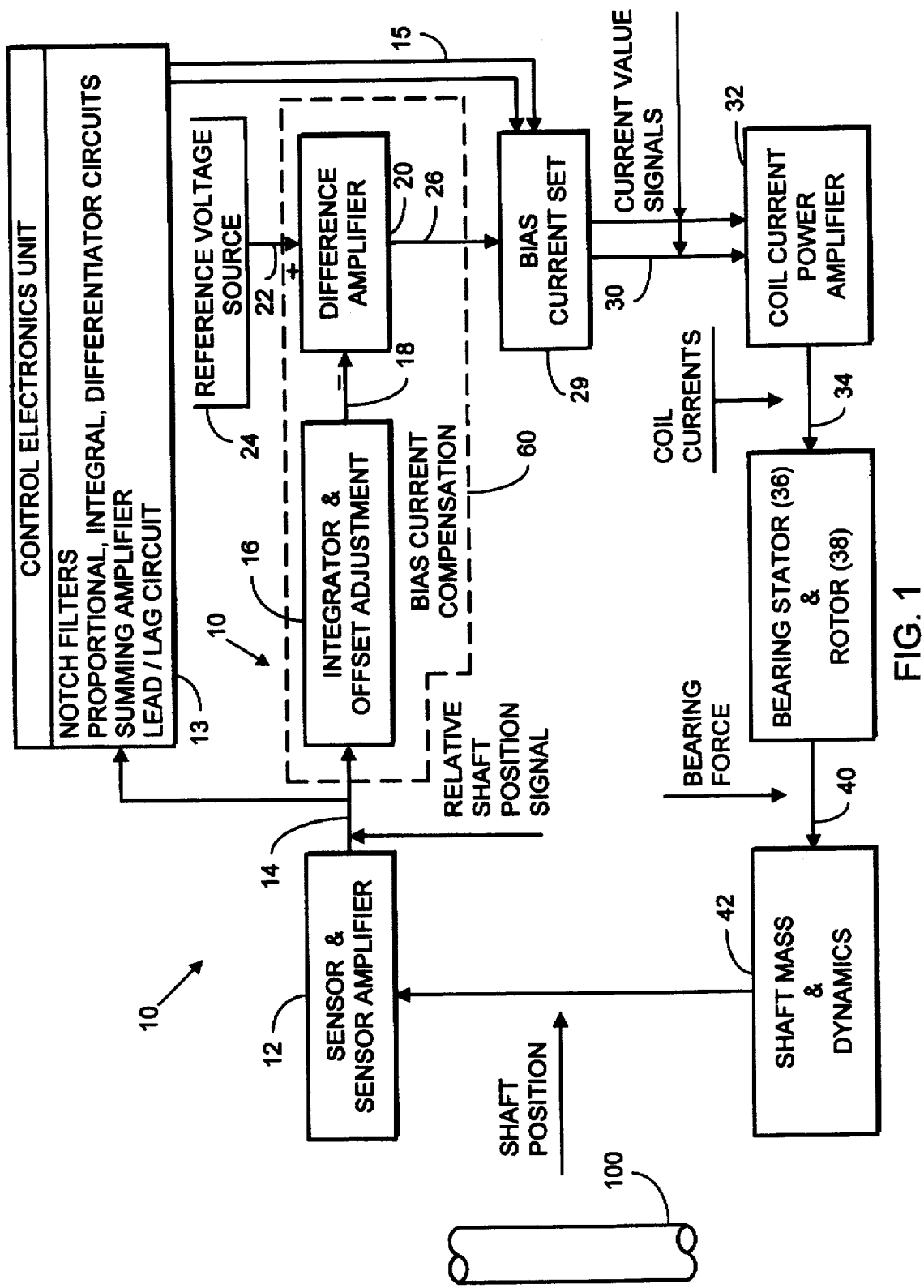
FIG. 1 is a schematic of the bias current control system of the present invention.

Referring now to the drawings, FIG. 1 shows a schematic of the magnetic bearing control system 10 of the present invention in control system format. The position of shaft 100 is detected by sensor and sensor amplifier block 12 which produces a relative shaft position signal 14. Relative shaft position signal 14 is received by control electronic unit block 13 which includes notch filters; proportional, integral, and differentiator circuits; summing amplifier; and lead/lag circuit, and generates a differential signal pair 15 which is sent to bias current set block 29. Bias current set block 29 produces the two current value signals 30 which control the bias currents in the opposing bearing coils positioned around the shaft. Amplitude changes of signal pair 15 generate a differential change in signal pair 30 proportional to the current required by the bearing coils to stabilize the shaft within the bearing when the stator-to-rotor air gaps are a fixed magnitude.

Current value signals 30 are received by coil current power amplifier block 32 which produces coil currents 34 which are received by bearing stator 36 and rotor 38 thereby producing bearing force 40 upon the mass of shaft 100 (represented in control system methodology as shaft mass and dynamics block 42 in FIG. 1) which, of course, results in the dynamics of shaft 100 which is, in turn, is detected by sensor and sensor and sensor amplifier block 12.

Relative shaft position signal 14 is also received by the bias current compensation block 60, a magnetic bearing control signal path which has been added in parallel to the magnetic bearing control electronics unit block 13 to compensate for variations in the stator-to-rotor air gaps. Bias current compensation block 60 is composed of the integrator and offset adjustment block 16 and difference amplifier block 20. Integrator and offset adjustment block 16 produces integrated control signal 18 from the relative shaft position signal 14 when the shaft-to-stator air gap dimensions vary. Integrated control signal 18 is subtracted from reference voltage 22, which is produced by existing reference voltage source 24, by difference amplifier block 20 to produce voltage signal 26 which is the primary reference for bias current set block 29. Output 26 is used by bias current set block 29 to simultaneously control the magnitude of the two current value signals 30 which set the bias currents in the opposing bearing coils. Prior to the inclusion of the bias current compensation 60 in the system, reference voltage 22 from the reference voltage source 24 was sent directly to bias current set 29 in place of bias current control signal 26.

For fixed stator-to-rotor air gap magnitudes under cold, non-rotating rotor conditions, integrated control signal 18 is approximately zero, and output 26 is equal to reference voltage 24. A reduction in the stator-to-rotor air gap magnitude produces a positive integrated control signal 18, which generates a reduction in the voltage signal 26. The reduced value of voltage signal 26 causes bias current set block 29 to produce a reduction in magnitude of both signals of current pair 30 in proportion to the percentage of voltage signal 26. This equally proportional change of both current value signals causes a proportional reduction of the bias currents on opposite sides of the shaft in the magnetic bearing which compensates for the reduced stator-to-rotor air gap reduction to maintain stable bearing system dynamics in the presence of the air gap change.

Figure 2A:
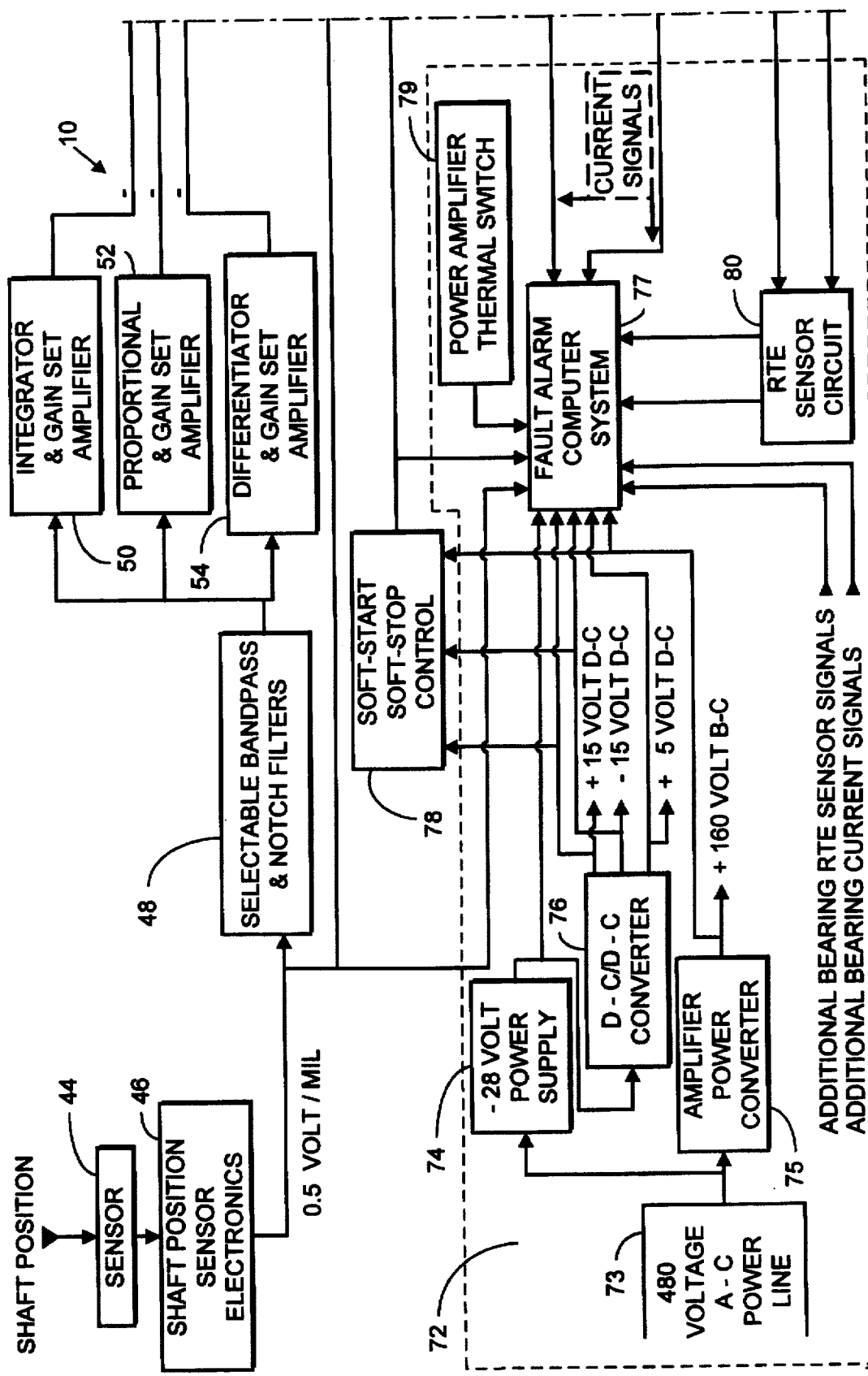
FIGS. 2A and 2B comprise is a schematic of the bearing control electronics of a single channel of the bias control system of the present invention.
Figure 2B:
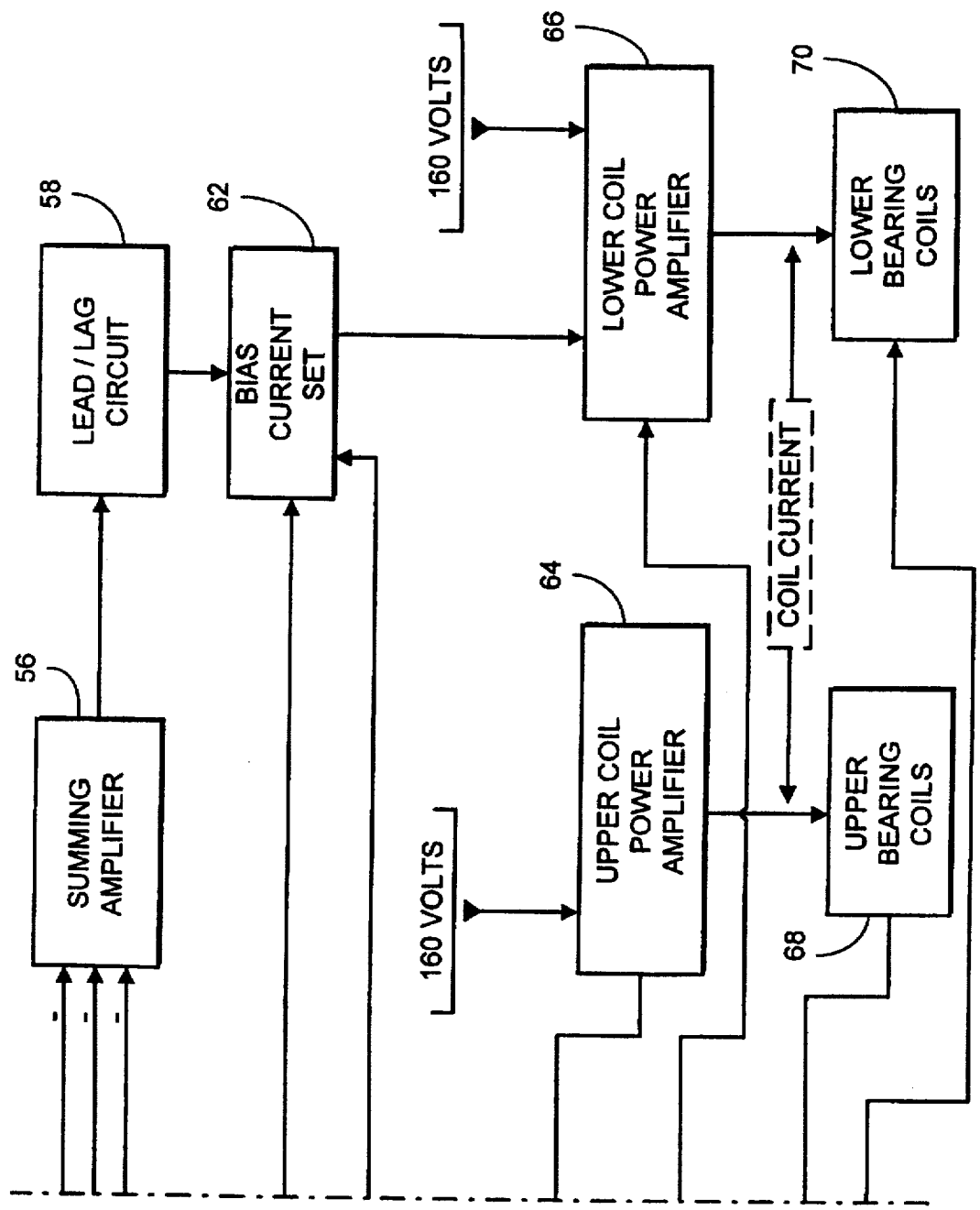

FIGS. 2A and 2B illustrate the magnetic bearing control system 10 of the present invention as an electronic schematic in more detail. Position of shaft 100 is detected by sensor 44 and the resulting signal is processed by shaft position sensor electronics 46 (sensor 44 and shaft position sensor electronics 46 roughly comprising sensor and sensor amplifier block 12 of FIG. 1). The output of shaft position sensor electronics 46 is filtered by selectable bandpass and notch filters block 48 and the resultant output is processed in parallel by integrator and gain set amplifier 50, proportional & gain set amplifier 52, and differentiator & gain set amplifier 54. The outputs of amplifiers 50, 52, 54 are summed by summing amplifier 56 and adjusted by lead/lag circuit 58 (notch filters 48, amplifiers 50, 52, 54, 56 and circuit 58 comprising integrator and offset adjustment block 13 of FIG. 1). In parallel, the output of shaft position sensor electronics 46 is processed by bias current compensation circuit 60, and the outputs of lead/lag circuit 58 and bias current compensation circuit 60 are received by bias current set block 62 (equivalent to bias current control circuit block 29 in FIG. 1). The output of bias current set block 62 is received by upper and lower coil power amplifiers 64, 66 (equivalent to the coil current power amplifier block 32 of FIG. 1) which, in turn, drives upper and lower bearing coils 68, 70.

Electrical system 72 includes 480 volt input 73 which supplies 28 volt power supply 74 and amplifier power converter 75. The 28 volt power supply 74 supplies DC/DC power converter 76 and fault alarm computer system 77. Amplifier power control provides 160 volt DC input to upper and lower coil power amplifiers 64, 66. Both amplifier power converter 75 and DC/DC power converter 76 supply input to soft-start soft-stop control 78 which supplies an input to bias current set block 62 and to fault alarm computer system 77. Fault alarm computer system 77 further receives input from power amplifier thermal switch 79, RTE sensor circuit 80 (which, in turn, receives input from upper and lower bearing coils 68, 70) and upper and lower coil power amplifiers 64, 66. Fault alarm computer system additionally receives signals from the RTE sensor circuits and upper and lower coil power amplifiers of additional bearings and/or channels (not shown).

Prior test results indicated that a deviation of the shaft from the stator center line occurred when the stator-to-rotor magnetic air gap varied more than five percent from its initial value. A review of the bearing force balance equation revealed that the magnetic bearing control circuit would not maintain the shaft on the bearing stator centerline when the air gap dimensions were varied from the initial gap value. The control circuit which performed the shaft centering operation differentially controlled the axial coil currents (increased magnitude of one coil current while simultaneously decreasing the opposite coil current by an equal amount) to counteract shaft force variations.

The force balance equation for one bearing axis of the system is:

$$F_{static} = \{(K_u)(I_{upper})^2/(g_{upper})^2\} - \{(K_l)(I_{lower})^2/(g_{lower})^2\}$$

where:

$F_{static}$ = the weight of the shaft being carried by the magnetic bearing axis and any additional static force on the shaft along the bearing axis $K_u$, $K_l$ = respective constants for the upper bearing axis coil and the lower bearing current coil $I_{upper}$, $I_{lower}$ = respective currents in the upper bearing axis coil and the lower bearing current coil $g_{upper}$, $g_{lower}$ = respective rotor-to-stator air gaps at the upper bearing axis coil and lower bearing current coil For the bearing system of the present invention, the currents in the upper and lower coils are the sum of the fixed value bias currents ($I_b$) and varying magnitude currents ($I_v$) which balance the bearing forces. The bias current values are set to allow linear control of the shaft dynamic forces, with the upper coil current larger than the lower coil current to produce the levitation force for the shaft weight. The values of the varying magnitude current values in the upper and lower coils are set by the amplitude of the signal from the shaft-to-stator location sensor. The amplified sensor signal produced equal amplitude, opposite polarity current variations in the upper and lower coils. The upper coil current is equal to the upper coil bias current plus the upper coil varying current while the lower coil current is equal to the lower coil bias current minus the lower coil varying current.

With a non-rotating shaft, the bearing air gap values are constant and the shaft was centered within the bearing stators. Under these circumstances, $g_{upper}^2 = g_{lower}^2$, and $K_u = K_l$, therefore:

$$F_{static} = [\{(I_{upper})^2 - (I_{lower})^2\}/(g_{lower})^2] * K_u$$

In an operating condition where the stator-to-rotor air gaps become smaller with temperature and rotor speed changes, the differential current control operates to counteract dynamic forces, and the static forces are fixed. Only a simultaneous reduction of the upper and lower bearing axis coil bias currents will allow the shaft to maintain a centered position within the stator. Also, the amount of current reduction must be proportional to the change in both the upper and lower air gap values for the shaft to stay centered within the bearing stator.

The magnetic bearing control system 10 of the present invention has been developed to maintain the shaft centered within the bearing stator when the geometry of the shaft-to-stator air gap is changed. This system operates by creating a feedback system which detects small changes in the shaft position with respect to the stator center line and varies the upper and lower bias currents by proportional amounts to maintain a constant bias current to gap ratio.

Further with respect to the above description, the integrator and offset adjustment block 16 of FIG. 1 includes the addition of a high gain integrator circuit which amplifies the difference between the relative shaft position signal 14 from the sensor and sensor amplifier block 12 and difference amplifier 20 which subtracts the integrated control signal 18 from the reference voltage block output 22. In a typical application, the integrator and offset adjustment block 16 uses a long integrator time constant of approximately one second to prevent this control path from responding to the dynamic shaft position signals produced by the shaft rotation. The offset and integrated shaft position signal 18 output from the integrator and offset adjustment block 16 is subtracted from the ten-volt reference voltage 22 and the difference amplifier block 20 output voltage 26 is supplied to the voltage divider networks of the bias current set circuit block 29 which is used to produce the control voltage that sets the value of the upper and lower bearing coil bias currents. This control of the supply voltage to the voltage dividers by voltage signal 20 produces a simultaneous change in both bias current values which is directly proportional to the change in the voltage signal magnitude.

The high gain characteristic of the integrator forces a bias current change which minimizes the shaft position change with respect to the stator center line as the bearing air gap changes. This feedback circuit is unconditionally stable and requires only the preliminary adjustment of the shaft center position voltage reference to maintain the shaft on the stator center line over the operational range of the rotational system.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A control system for a magnetic bearing, the magnetic bearing including a rotor responsive to a shaft and a stator including upper and lower magnetic coils, the control system including:

sensor means for determining a relative position of the shaft;

means for integrating and offsetting said relative position of the shaft;

means for subtracting an output of said means for integrating and offsetting from a reference voltage;

bias current control means responsive to said means for subtracting, said bias current control means including voltage dividers which generate a voltage output;

coil current amplifier means receiving said voltage output from said bias current control means, said coil current amplifier means generating a current to the upper and lower coils of the magnetic bearing.

2. The control system of claim 1 wherein said means for integrating and offsetting includes a time constant of approximately one second.

3. The control system of claim 1 wherein the means for integrating and offsetting further includes means for setting an integrator gain.

4. The control system of claim 3 wherein said means for integrating and offsetting further includes means for setting bearing static stiffness.

5. The control system of claim 4 wherein said means for integrating and offsetting further includes means for setting bearing dynamic stability.

6. The control system of claim 1 further including frequency dependent filters for filtering output from said sensor means.

7. The control system of claim 1 wherein said coil current amplifier means includes an upper coil amplifier for providing current to said upper magnetic coil and a lower coil amplifier for providing current to said lower magnetic coil, and wherein said bias current control means, in response to a change in output of said sensor means, effects a simultaneous change in output of said upper and lower coil amplifiers which is directly proportional to the change in the change in output of said sensor means.

8. The control system of claim 4 wherein said means for setting bearing static stiffness includes proportional and gain set amplifying means.

9. The control system of claim 5 wherein said means for setting bearing dynamic stability includes differentiating and gain set amplifying means.

* * * * *